Jan. 12, 1971 W. HASSEMAN 3,553,881
FISHING TRAP
Filed Feb. 14, 1969 3 Sheets-Sheet 1
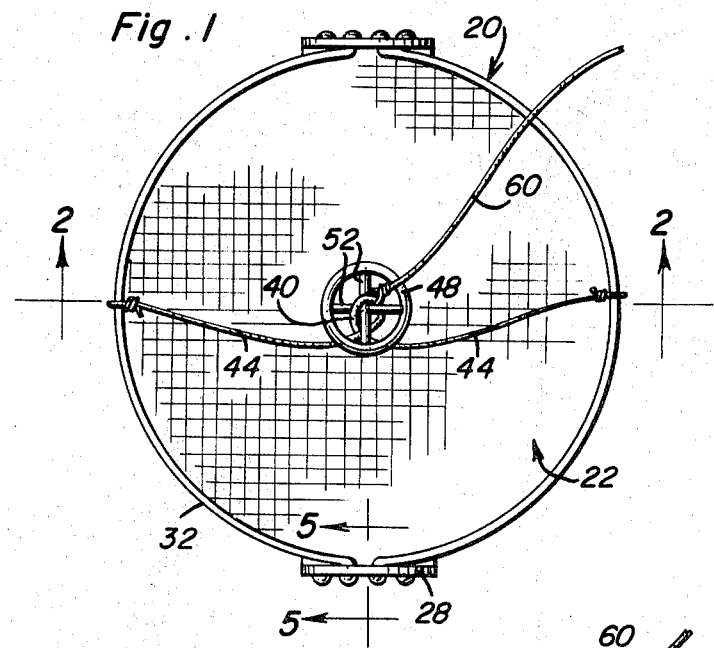
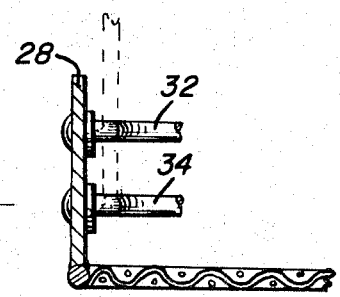
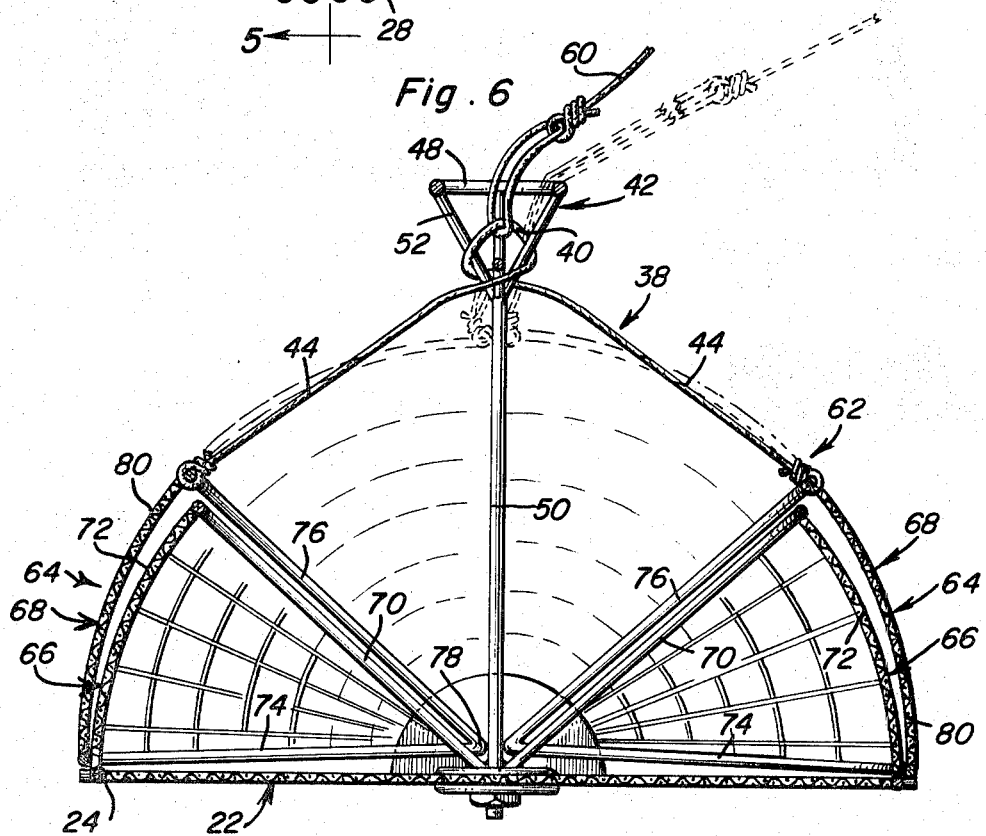
Walter Hasseman
INVENTOR.
BY Clarence A. O'Brien
and Harvey B. Jacobson
Attorneys

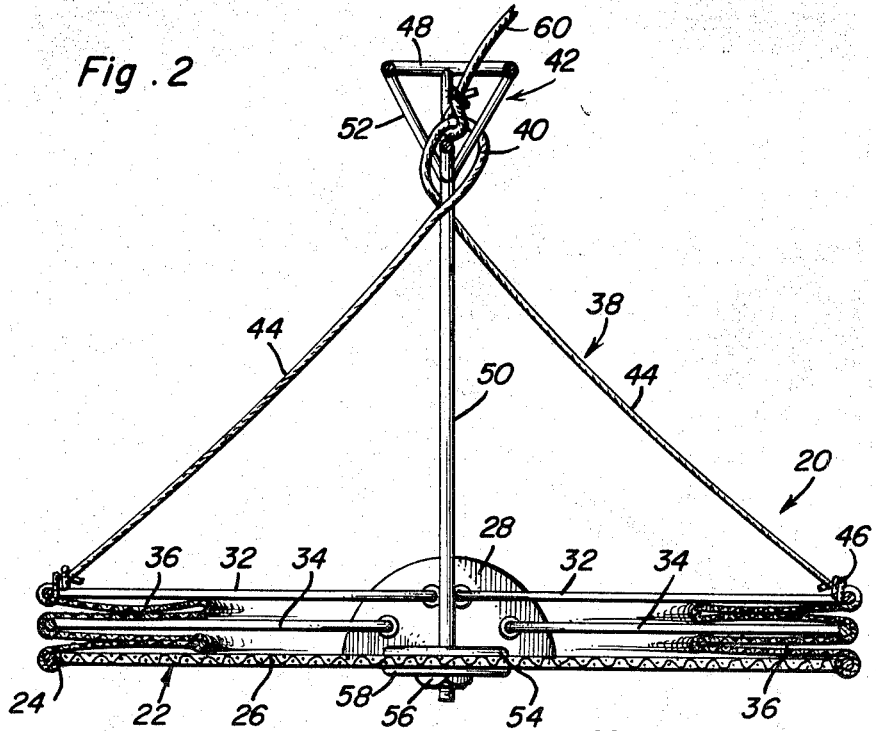
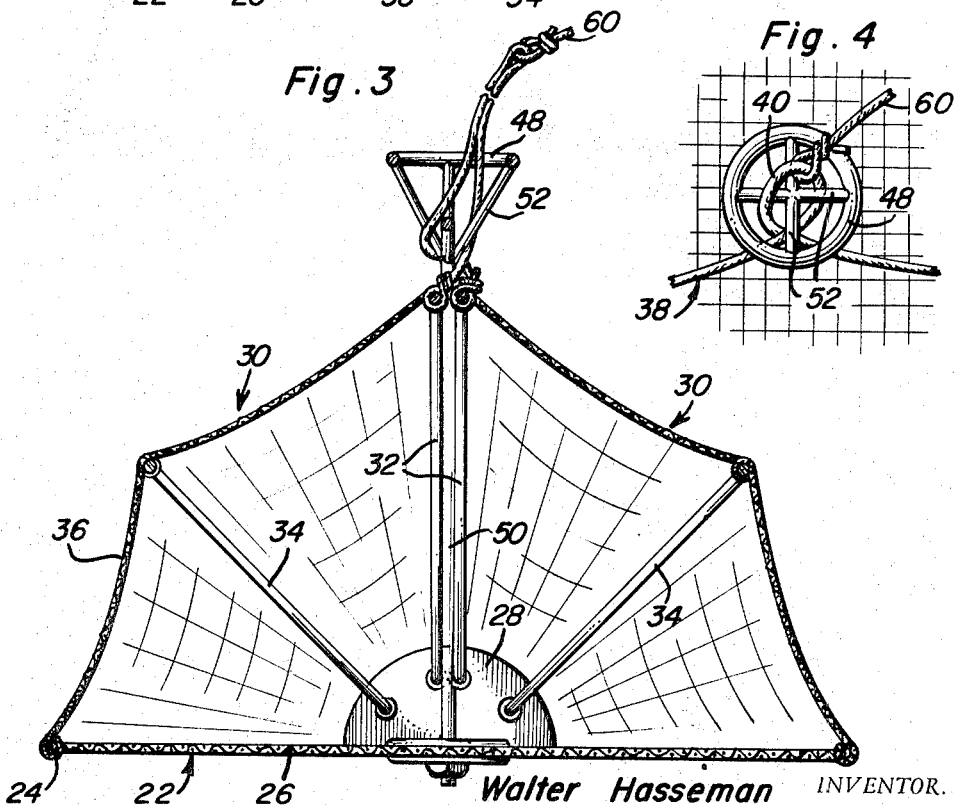

Jan. 12, 1971 W. HASSEMAN 3,553,881
FISHING TRAP

Filed Feb. 14, 1969 3 Sheets-Sheet 3

Walter Hasseman
INVENTOR.

BY Clarence A. O'Brien
and Harvey B. Jacobson
Attorneys

United States Patent Office 3,553,881
Patented Jan. 12, 1971

3,553,881
FISHING TRAP
Walter Hasseman, Ocean City, Md., assignor, by direct and mesne assignments, to James S. Noce, Berwyn, Pa., and William F. Willey, Ocean City, Md.
Filed Feb. 14, 1969, Ser. No. 799,283
Int. Cl. A01k 69/10
U.S. Cl. 43—105                     6 Claims

ABSTRACT OF THE DISCLOSURE

A hand castable fish trap including a planar bottom, opposed pivotally mounted screen or net-like sections movable between an outwardly collapsed position and an inwardly swung enclosure forming position, a control line from each section to a central guide and a handline engaged with the control line or lines for use in both closing the sections and hauling in the trap. The central guide includes, in most embodiments, a configuration which precludes any possibility of the line fouling.

---

The instant invention relates to new and useful improvements in fishing traps, and more particularly is directed to specific and significant improvements over the basic trap disclosed in applicant's Pat. No. 2,603,031.

It is a primary object of the instant invention to provide a trap wherein the handline is so orientated relative to the trap as to be substantially foul-proof.

In addition, it is a significant object of the instant invention to provide control cords or lines wherein the opposed sections or bellows-like members can be closed in a synchronized manner without any undesirable tipping or displacing of the trap prior to a complete closing thereof.

In conjunction with the provision of a substantially foul-proof unit, it is an important object of the instant invention to provide a trap which is particularly adapted for hand casting.

Additional objects residing in the instant invention are the provision of a fishing trap which can be economically produced, which is both simple in operation and practical, and which is in fact highly reliable in use.

Basically, the objects of the instant invention are achieved through the provision of a trap which includes a flat mesh-like base having opposed bellows-like or folding sections hinged thereto for movement between an outwardly folded or collapsed position to an inwardly pivoted enclosure forming closed position. The inward movement of the opposed sections is effected by a handline engaged with the sections through either a continuous control line or a pair of control lines which extend through a central stem or post-mounted guide, preferably crossing at the guide so as to provide a positive closing force on the sections as the handline pulls thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the trap of the instant invention;

FIG. 2 is an enlarged cross-sectional view taken substantially on a plane passing along line 2—2 in FIG. 1;

FIG. 3 is a cross-sectional view similar to FIG. 2 with the trap sections closed;

FIG. 4 is an enlarged sectional top plan view of the control line guide;

FIG. 5 is an enlarged cross-sectional detail taken substantially on a plane passing along line 5—5 in FIG. 1;

FIG. 6 is a cross-section view through another embodiment of the trap;

Figure 7:
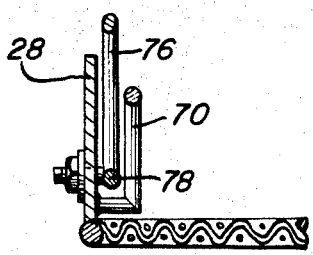
FIG. 7 is an enlarged cross-sectional detail illustrating the section mounting means associated with the embodiment of FIG. 6.

Referring now more specifically to the drawings, reference numeral 20 is used to generally designate the trap comprising the instant invention. This trap 20 includes a flat bottom or base 22, illustrated as being circular although not specifically limited thereto. This bottom 22 is defined by a peripheral rigid bar or rod 24 to and within which a screen or mesh wall 26 is suitably fixed. This bottom wall 26, as will be appreciated, can either be of flexible mesh suitably tensioned within the peripheral rod 24, or rigid metal or plastic screening.

A pair of upstanding ears 28 are affixed to the peripheral rod or bar 24 at diametrically opposed points with the center the trap 20 being defined therebetween.

A pair of bellows-like members or folding sections 30 are positioned to each side of the centerline of the trap. Each of these sections 30 includes a pair of semicircularly bent or formed rods 32 and 34 which approximate the size and curvature of one half of the base rod 24. Each of the rods 32 and 34 have the opposite end portions thereof outwardly turned and rotatably received through apertures in the opposed upstanding ears 28, as will be best appreciated from the sectional detail of FIG. 5. These out turned ends can, as illustrated, incorporate enlarged heads on the extreme tips thereof located outward of the corresponding ears 28 so as to rotatably retain the outturned ends in the ears 28 without interfering with the free pivotal movement of the arcuate rods 32 and 34.

With reference particularly to FIGS. 2 and 3, it will be noted that the rods 32, constituting the inner rods, pivotally engage the opposed ears 28 at approximately the center thereof adjacent the upper edge, while the outturned ends of the rods 34, the outer rods, engage the ears 28 toward the sides of the ears 28 between the inner rods 32 and the base or bottom 22. The opposed sections or bellows-like members 30 are completed by the provision of a flexible foraminous screening or net 36 engaged with each set of rods 32 and 34 as well as the corresponding semi-circular portion of the base rod 24. With reference to FIG. 3 in particular, it will be appreciated that the arcuate or semicircular rods 32 and 34 are so anchored to the netting 36 as to spread the netting, upon a raising of the two sections 30, into a generally dome shape providing a closed enclosure, the outer rods 34 being positioned, in the closed position of the trap, approximately at a 45 degree angle between the horizontally orientated base rod 24 and the perpendicularly orientated inner rods 32.

In order to effect a raising of the opposed sections 30, and consequently a closing of the trap 20, an elongated control line 38 is provided. This control line 38 has the central portion 40 thereof located through a guide unit 42 and includes a pair of oppositely directed line portions 44 which extend to the center of the two inner rods 32 to which they are appropriately tied or anchored as indicated by reference numeral 46. In other words, the opposite ends of the elongated control line 38 are fixedly tied to the two opposed sections 30.

The guide unit 42 consists of a horizontal ring 48 mounted on the upper end of a vertical post 50 by four upwardly diverging straight rods or braces 52, defining in effect an inverted cone on the upper end of the post 50.

This post 50 projects vertically from the center of the bottom or base 22 and can be affixed thereto in any suitable manner. For example FIGS. 2 and 3 illustrate a rigid plate 54 affixed to the post 50 upward from the lower end thereof with the post 50, below the plate 54, projecting through the mesh bottom 26 and having an appropriate nut 56 threaded thereon so as to upwardly clamp a lower plate 58 against the undersurface of the bottom 22 in opposed relation to the fixed plate 54. Should additional stability be needed for the post 50, it will be appreciated that an appropriate cross brace can be extended diametrically across the bottom 22 and affixed to the opposed portions of the bottom annular rod 24.

Returning now to the control line 38, it will be noted that the opposed portions 44 thereof extend from the outer secured ends thereof inwardly and upwardly beyond the post 50 and into the looped portion which passes between the ring supporting rods 52. The closing of the sections 30, as well as the hauling in of the trap 20 is effected by an elongated handline 60 which is knotted or otherwise affixed to the looped portion 40 within the conical space defined by the rods 52, this handline 60 extending upwardly through the guide ring 48. Thus, noting FIGS. 2 and 3, as the handline 60 is pulled upwardly, the looped portion 40 of the control line 38 will be drawn upwardly through the guide ring 48, swinging the sections 30 upwardly into relatively tight and generally sealing engagement against the support post 50. It will also be appreciated that the crossing of the control line portions 44 with the center post 50 ensures a tight drawing of the opposed inner section rods 32 thereagainst. By the same token, the slight wrapping of the control line 38 about the ring supporting rods 52 will tend to resist any opening of the sections 30 should there be a slight relaxation of the tension on the handline 60.

Utilizing such an arrangement, it will be appreciated that the closing of the opposed sections 30 will be synchronized. Further, the pull thereon will be equalized to the opposite sides of the center post, thus tending to effect a positive upward closing of the sections 30 without a tipping of the trap in a manner such as might result in a loss of the catch. Also of significance is the fact that the trap 20 is foul-proof in nature. That is, when the trap 20, opened as in FIG. 2, is cast outwardly, should the handline 60 tend to wrap about the post 50, this line 60 will easily strip upwardly therefrom due to the inverted conical nature of the guide unit 42 within which the secured inner end of the handline 60 extends. Incidently, while the control line 38 has been described as consisting of a single line, it will of course be appreciated that the two portions 44 thereof can be separate lines, in which instance, the upper or inner ends of the separate lines will be both, subsequent to a passing of the inner ends beyond the post 50 and through the rods 52, directly connected to the end of the handline 60.

Referring now specifically to the embodiment of FIGS. 6 and 7, it should be appreciated that this embodiment, designated by reference numeral 62, differs from the trap 20 only in the specific construction of the opposed folding sections 64. Each section 64 includes a fixed lower portion 66 and a movable upper portion 68 which moves from a first open position telescoped over the lower section 66 as illustrated in full lines in FIG. 6, to a second raised or closed position pivoted upwardly against the center post 50 so as to define in effect a continuation of the corresponding lower section 66 in covering or enclosing the trap 62. The lower portion 66 of each section 64 includes an upper arcuate or semicircular rod 70 which has the opposite ends thereof affixed to the opposed ears 28 and which extends upwardly and outwardly at approximately a 45 degree angle, generally following the curvature of the corresponding portion of the base rod 24. The inner or lower portion 66 is completed by the provision of a netting 72, preferably of a rigid screen-like material, having the opposed edges thereof affixed to the corresponding semicircular portion of the base rod 24 and the overlying semicircular rod 70.

The outer portion 68 of each of the folding sections 64 is in turn formed by a pair of semicircular rods 74 and 76 orientated at approximately 45 degrees to each other so as to, in the open position of the trap 62, have the rod 74 generally parallel and overlie the horizontal bottom 22 and the rod 76 generally parallel to the arcuate rod 70. The opposite ends of the rods 74 and 76 converge toward and are rigidly affixed to each other as at 78 with these opposite ends in turn being rotatably secured to the opposed ears 28 as will be be best appreciated from FIG. 7. Finally, each of the outer portions 68 is completed by the provision of an appropriate netting or screen-like material 80 thereon, such material preferably being relatively rigid in nature. Each outer portion 68 is slightly higher than the corresponding inner portion 66 and adapted, when moved to its closed position, to slightly overlie the upper edge of the lower or inner portion 66 as to provide a substantially complete seal therebetween. When open, an approximately 90 degree mouth will be provided for the trap 62 as will be appreciated from FIG. 6, this mouth or opening in the trap 62 extending, across the center of the trap, relatively close to the bottom 22 so as to allow easy access thereto by the sea life to be trapped therein. As will be appreciated by a comparison of FIGS. 2 and 6, the remainder of the structure of the trap 62, including the orientation of the control line 38 and the guide unit 42, is similar, and accordingly, like reference numerals have been utilized.

Figure 8:
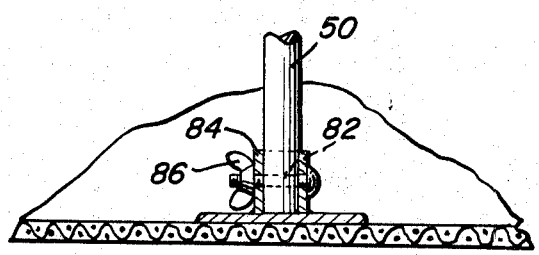
FIG. 8 is a detail view illustrating a modified manner of mounting the guide supporting post for selective folding.

Referring now particularly to FIG. 8, this figure illustrates a modified manner of mounting the lower end of the center post 50. This amount is pivotal in nature in that the lower end of the rod 50 rotatably receives an elongated bolt 82 therethrough, the bolt 82 in turn projecting through a pair of upwardly projecting ears 84. These ears 84, while rigidly secured to the bottom 22, are capable of, upon the tightening of an appropriate nut 86 on the threaded end of the bolt 782, being flexed slightly inward so as to rigidly clamp the lower end of the post therebetween so as to fix the position of the post. With this arrangement, when the trap, whether it be trap 20 or trap 62, is not being used, a further compacting of the trap for storage and handling purposes is possible by downwardly swinging the post 50. By the same token, when the trap is to be used, the post 50 will be positioned upright and locked in this position by the mounting bolt 82 flexing the bottom mounted opposed ears 84 inwardly thereagainst.

Figure 9:
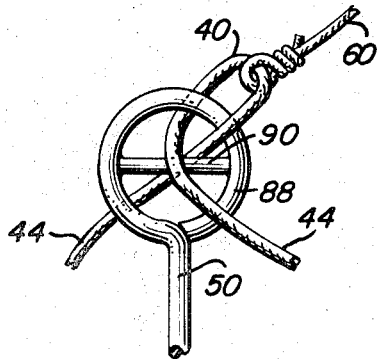
FIGURES 9–13 illustrate modified forms of the control cable or line guide means.

FIGS. 9 through 13 illustrate various forms of guide units mounted on the upper end of the center post 50 and so formed as to enable a synchronized upward closing of the opposed sections without any premature tipping or upsetting of the trap, while at the same time effecting a positive retention of the sections against the center post as the trap is being hauled in and also being substantially foul-proof in nature. More particularly, the guide unit of FIG. 9 is defined by a vertical ring 88 which can, as illustrated, actually be formed from the upper end of the associated post 50, the guide unit being completed by a transverse or diametrically extending bar 90 over which the opposed guide line portions 44 cross as the guide line loop 40 is defined about the upper portion of the ring 88 above the crossbar 90. The handline 60 locks or is knotted to the loop 40 outward of the ring 88.

Figure 10:
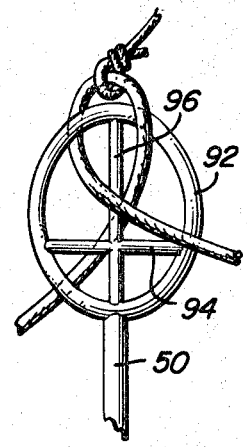

The guide unit in FIG. 10 is similar to that in FIG. 9 and includes a vertically orientated oval-shaped rod 92 having both a horizontal and a vertical crossbar 94 and 96. In this instance, the control line sections 44 cross the vertical rod or bar 96 and extend in opposite directions through the two upper quadrants, looping over the oval rod 92 and being affixed to the handline 60 above the oval loop. In both FIG. 9 and FIG. 10, it will be appreciated that any tendency for the handline 60 to wrap about the post 50 as the trap is being cast will be easily overcome by the handline 60 conveniently slipping over the guide units.

Figure 11:
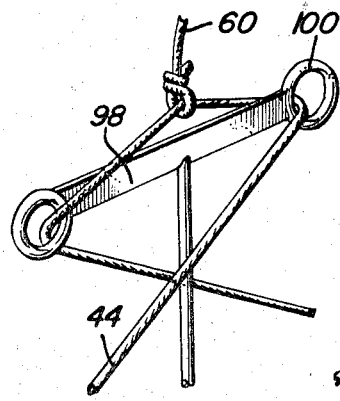

FIG. 11 has the guide unit consisting of a vertically orientated horizontally extending flat bar 98 mounting, at the opposite ends thereof, a pair of rings or annular rods 100. With this arrangement, each of the guide line portions 44 crosses over the post 50, one to each side thereof, and extends through the far ring 100 prior to looping back over the transverse bar 98, the handline 60 being affixed to a portion of the control line extending over the bar 98.

Figure 12:
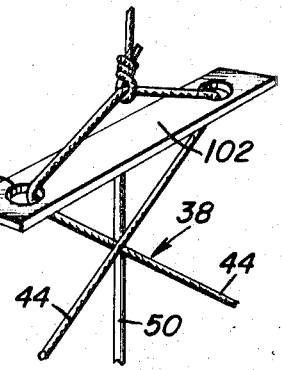

The control unit of FIG. 12 consists of a horizontally orientated and extending flat bar 102 incorporating vertical guide holes or openings 104 through the opposite ends thereof. In this instance, the control line portions 44 also cross the center post 50 to the opposite sides thereof and extend upwardly through the far openings 104 to cross over the upper surface of the bar 102 at which point the handline 60 is affixed to the control line.

Figure 13:
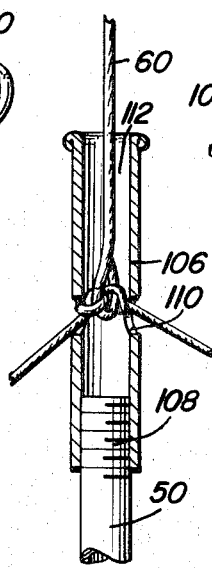

The final form of guide unit is illustrated in FIG. 13 and consists of a vertical tube 106 internally threaded for reception on the threaded upper end 108 of the center post 50. This guide tube 106 includes a pair of diametrically opposed control line receiving holes 110 therein, as well as a vertical bore 112 through which the handline 60 extends into engagement with the control line. The handline 60 extends through the open upper end of the bore 112 and, upon a pulling thereof, will draw the opposed portions 44 of the control line inwardly through the openings 110 and upwardly through the tube bore 112. In order to reduce wear on the lines, the upper end of the tube 106 is rolled outwardly. By the same token, the opposd control line openings 110 can have rounded edges. The form of guide unit in FIG. 13 is also of significance in illustrating another form which is particularly adapted to prevent any tendency for the handline to foul as the trap is being cast.

From the foregoing, it will be appreciated that a unique fishing trap has been described, this trap, in addition to being easily cast due to the collapsed nature thereof whereby the trap assumes a substantially flat shape, is also so formed as to effectively close and entrap sea life therein through a positive synchronized movement of the opposed sections without tilting or otherwise displacing the trap itself.

In conclusion, it should be appreciated that while the trap has been defined as including a circular base and a generally hemispherical enclosure, any appropriate shaped base, for example rectangular, square, or even oval, can be utilized, such a trap only requiring that the net mounting section forming rods be so configured as to agree with the peripheral shape of the base. In other words, were the base to be rectangular, the section forming rods would be, in each instance, U-shaped with right angular bends therein.

The foregoing is considered as illustrative only of the principles of the invention. Further, since numerous modifications and changes will readily occur to those skilled in the art, it is not desired to limit the invention to the exact construction and operation show and described, and accordingly all suitable modifications and equivalents may be resorted to, falling within the scope of the invention.

I claim:

1. A fishing trap comprising a base, a pair of folding sections mounted on the base and movable toward and away from each other from a first outward position opening said trap to a second inward position closing said trap, an upwardly directed guide fixed to and positioned vertically above said base centrally between the folding sections, a flexible control line having the opposed ends thereof fixed to the two folding sections at a central portion thereon, said control line extending from said sections to and through the centrally located guide for a movement of the central portion of the control line through said guide and a corresponding synchronized movement of the sections between the opened and closed positions thereof, said guide including at least one line passing opening defined therethrough for the reception of the central portion of the control line, the central section of said control line defining a loop at least partially within said guide, said control line being defined by two side portions, each portion extending from a secured end at one of the folding sections to the centrally located guide, said control line side portions crossing each other at said guide in defining the central loop, and an elongated handline engaged with the central portion of said control line at the guide for a selective drawing of the control line upward through the guide, each folding section consisting of a fixed lower screen-like portion generally conforming to the periphery of the base to the corresponding side of the centrally located guide and rising thereon, along a generally arcuate path, to approximately midway between the base and the guide, and a second screen-like portion pivotally mounted to the base for a swinging movement between a first position overlying the first portion, and constituting the aforementioned first portion of the folding sections, and a second position swung upwardly therefrom and positioned between the upper portion of the first portion and the centrally located guide, this second position corresponding to the aforementioned second position of the folding sections.

2. The trap of claim 1 wherein said guide includes a horizontally orientated ring and a plurality of support rods depending therefrom.

3. The trap of claim 1 wherein said guide includes a vertically orientated ring with at least one rigid crossbar therein.

4. The trap of claim 1 wherein the second screen-like portion of each folding section is of a greater height than the corresponding lower screen-like portion, said second portion, in the upwardly swung second position thereof, overlying the upped edge area of the lower portion so as to provide a seal therebetween.

5. The trap of claim 1 including a single elongated post rising centrally from said base, said post mounting said guide on the upper end thereof.

6. A fishing trap comprising a base, a pair of folding sections mounted on the base and movable toward and away from each other from a first outward position opening said trap to a second inward position closing said trap, an upwardly directed guide fixed to and positioned vertically above said base centrally between the folding sections, a flexible control line having the opposed ends thereof fixed to the two folding sections at a central portion thereon, said control line extending from said sections to and through the centrally located guide for a movement of the central portion of the control line through said guide and a corresponding synchronized movement of the sections between the opened and closed positions thereof, said guide including at least one line passing opening defined therethrough for the reception of the central portion of the control line, and an elongated hand line engaged with the central portion of said control line at the guide for a selective drawing of the control line upward through the guide, each folding section consisting of a fixed lower screen-like portion generally conforming to the periphery of the base to the corresponding side of the centrally located guide and rising thereon, along a generally arcuate path, to approximately midway between the base and the guide, and a second screen-like portion pivotally mounted to the base for a swinging movement between a first position overlying the first portion, and constituting the aforementioned first portion of the folding sections, and a second position swung upwardly therefrom and positioned between the upper portion of the first portion and the centrally located guide, this second position corresponding to the aforementioned second position of the folding sections.

(References on following page)

References Cited

UNITED STATES PATENTS

| | | | |
|---|---|---|---|
| 953,255 | 3/1910 | Brown | 43—105 |
| 1,074,276 | 9/1913 | Masek | 43—105 |
| 1,188,185 | 6/1916 | Krulish | 43—105 |
| 2,218,843 | 10/1940 | Fuller, Jr. | 43—105 |
| 2,603,031 | 7/1952 | Haseman | 43—105 |

FOREIGN PATENTS

| | | | |
|---|---|---|---|
| 24,348 | 2/1922 | France | 43—102 |

WARNER H. CAMP, Primary Examiner